United States Patent [19]

Onishi et al.

[11] 3,949,696

[45] Apr. 13, 1976

[54] MARINE STEERING ARRANGEMENT

[75] Inventors: Kazutoshi Onishi; Tsuneo Awano, both of Yokohama; Isao Masuzawa, Kuki, all of Japan

[73] Assignee: Tokyo Keiki Company Limited, Tokyo, Japan

[22] Filed: Sept. 23, 1974

[21] Appl. No.: 508,282

Related U.S. Application Data

[63] Continuation of Ser. No. 371,041, June 18, 1973, abandoned.

[30] Foreign Application Priority Data

June 21, 1972 Japan.............................. 47-62054

[52] U.S. Cl........... 114/144 E; 114/144 A; 318/588
[51] Int. Cl.²....................................... B63H 25/24
[58] Field of Search.... 180/79.1; 114/144 R, 144 A, 114/144 E; 244/50, 77 E, 77 M; 307/92; 317/60 A; 318/563, 565, 566, 588, 626; 340/30, 419

[56] References Cited
UNITED STATES PATENTS

| | | | |
|---|---|---|---|
| 2,823,877 | 2/1958 | Hess, Jr. ......................... | 318/565 X |
| 3,129,686 | 4/1964 | Sakson ........................... | 114/144 R |
| 3,199,013 | 8/1965 | Brahm et al. ................... | 318/563 |
| 3,527,186 | 9/1970 | Wennberg et al. .............. | 114/144 R |
| 3,662,243 | 5/1972 | Cavil et al. ..................... | 318/588 |
| 3,739,738 | 6/1973 | Cavil .............................. | 114/144 R |

*Primary Examiner*—Trygve M. Blix
*Assistant Examiner*—Stephen G. Kunin

[57] ABSTRACT

A marine steering arrangement wherein each of the starboard steering switch and port steering switch connected to a power source is closed upon receipt of an actuating signal resulting from a difference between an order signal of a rudder angle and an actual signal of a rudder angle, so as to conduct power to a rudder driving mechanism, rotating the rudder to the order rudder angle position within an allowable extent of the rudder angle, is provided with an improvement which further comprises at least one limit switch for shutting off the power source to stop any further rotation of the rudder beyond either of the rudder angle limits.

6 Claims, 5 Drawing Figures

MARINE STEERING ARRANGEMENT

This is a continuation of application Ser. No. 371,041, filed June 18, 1973, now abandoned.

This invention relates to a steering arrangement mounted on shipping.

Operation of rudder driving means such as an electric motor or an oil hydraulic equipment has often been effected under an electric remote control or an automatic control. In case of employing a reversible electric motor as said rudder driving means, the rudder rotation is defined by a motor control circuit. For example, by using an oil hydraulic equipment as said rudder driving means, the rudder movement is determined by a solenoid controlled valve for controlling the hydraulic equipment. When a large capacity mechanism is used to drive the rudder, the operation of said mechanism is sometimes controlled by other electric or oil hydraulic equipments between said mechanism and a separate control means.

The operation of the rudder is restricted in an angle range due to its specific construction. Accordingly, there are provided a starboard and a port angle limit inside of said angle range, and the rotation of the rudder is limited within the allowable extent of rudder angle formed by both angle limits, preventing the rudder from exceeding said angle range.

When the rudder driving means comprises a reversible series electric motor provided with two field windings, one of said windings is used to drive the motor in the starboard direction and the other in the port direction. To the starboard field winding are serially connected a starboard steering switch and a starboard limit switch. To the port field winding are serially connected a port steering switch and a port limit switch.

While the rudder is driven within the allowable extent, both limit switches remain closed. When the starboard or port steering switch is closed upon receipt of an actuating signal, the field winding connected to the steering switch is excited to drive the electric motor and to rotate the rudder in starboard or port direction. When the rudder reaches the starboard angle limit, the starboard limit switch is opened to stop the motor and in consequence the rudder rotation. At this time, as the port limit switch remains closed, by applying an actuating signal to close the port steering switch, the motor is driven again to bring the rudder back to a position within the allowable extent, returning the starboard limit switch to a closed state. Accordingly, proper operation of the starboard and port steering switches enables the rudder to be rotated to a prescribed position, attaining the steering of a ship to any desired course.

When the rudder reaches the port angle limit, a similar operation as described above causes the rudder to be restored to the allowable extent.

When the starboard steering switch remains closed by an accident during the starboard rotation of the rudder, the rudder will be moved up to the starboard angle limit and brought to reset. Even if, during the starboard rotation of the rudder within the allowable extent, the port steering switch is closed for the reverse rudder movement, the motor will still continue the starboard drive in the case of a light load, though the motor will stop in the case of a heavy load.

Therefore, the continued starboard drive of the motor will cause the rudder to be moved up to the starboard angle limit and then be brought to rest at that point due to the starboard limit switch being opened. At this time, the port limit switch is closed. If, therefore, the port steering switch is closed and kept in this state, the motor will eventually commence reverse rotation, causing the rudder to move within the allowable extent. Since at this time, the starboard limit switch is closed and the starboard steering switch is also closed due to the aforesaid accident, current flows through the starboard field winding. However, the electric motor maintains its port drive due to its specific property and when the rudder reaches the port angle limit, the port limit switch is opened, resulting in the eventual stop of the motor and rudder. Since, however, the starboard limit switch is closed and the starboard steering switch is also closed due to the aforesaid accident, the motor is driven immediately in the reverse direction to rotate the rudder in the starboard direction. While above-mentioned failure of the starboard steering switch remains uncorrected, the motor repeats the starboard and port drives by turns, causing the rudder to reciprocate its starboard and port rotations between both angle limits. Both when the motor stops due to a heavy load and when the motor repeats the starboard and port drives by turns as described above, there arises the failure of the motor or its associated parts due to overheating.

When the rudder is driven by means of oil hydraulic power, a solenoid controlled valve is provided, having a starboard and a port solenoid, each of which is connected serially to a steering switch and a limit switch. Each limit switch is opened when the rudder reaches one of the corresponding angle limits. Then the failure of the starboard or port steering switch will give the same difficulties as in the case of the motor, namely, the failure of the solenoid controlled valve or its associated parts due to overheating.

As mentioned above, the prior art marine steering arrangement can indeed prevent the excessive rotation of the rudder beyond either of the angle limits due to the independent operation of the starboard and port limit switches, but due to the independent operation of both limit switches this marine steering arrangement has a drawback, namely, damages occurred by the failure of operation control members.

It is an object of this invention to provide a marine steering arrangement free from above-mentioned drawback which can not only prevent any rudder movement beyond either of the angle limits but also provides full safety and protection against the failure of operation control members.

To accomplish this object, the marine steering arrangement of this invention comprises a rudder angle setting unit for generating an order signal; a rudder angle transmitting unit for producing an actual signal; an actuating signal generator producing an actuating signal effecting the rudder rotation upon receipt of both order and actual signals; two steering switches operated according to said actuating signal; at least one limit switch for limiting the rudder within an allowable extent; and a rudder driving mechanism for moving the rudder to a position corresponding to the order signal by power supplied from its source through either of the steering switches, and the improvement of this marine steering arrangement consists in that the limit switch is of a normally closed type connected in series to the power source and designed to be opened whenever the rudder reaches either of the starboard and the port angle limits, so as to cut off the power source. According to the invention, therefore, when the rudder reaches either starboard or port angle limit due to the failure of any electric part, the power supply is sure to cut off to prevent any further rotation of the rudder beyond the angle limit even if an actuating signal is later issued. Therefore the marine steering arrangement of this invention prevents the reciprocating movement of the rudder and any other difficulties resulting from said reciprocating movement of the rudder, including damage of electric parts.

As described above, the rudder driving mechanism is electrically connected with the power source, between them provided with said both steering switches and said at least one limit switch. For example, when one limit switch is provided, this limit switch may be connected in a wire which is connected to the power source and to each steering switch, or may be connected in a wire, which is connected to the power source and to the rudder driving mechanism. When two limit switches are provided, these limit switches may be connected serially and located in the same positions as above example. In this case, when the rudder reaches either of the angle limits, at least one limit switch is opened to shut off the power source. By another example when two limit switches are provided, one of the limit switches may be serially connected to one of the steering switches, and the other limit switch to the other steering switch. In this case, when the rudder reaches either of the angle limits, both limit switches are opened substantially at the same time to shut off the power source.

This invention can be more fully understood from the following detailed description when taken in connection with reference to the accompanying drawings, in which.

Figure 1:
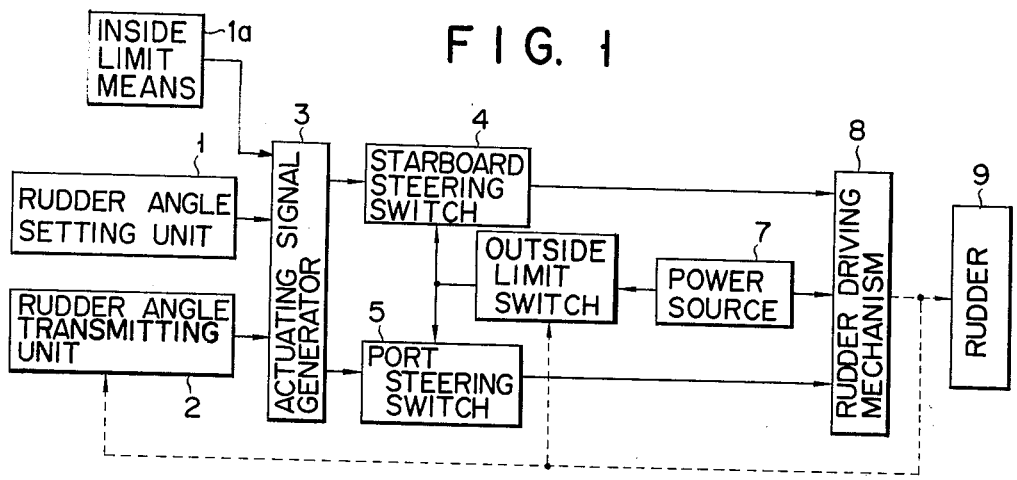
FIG. 1 is a block circuit diagram of an embodiment of the marine steering arrangement according to this invention which is provided with a limit switch.
Figure 3:
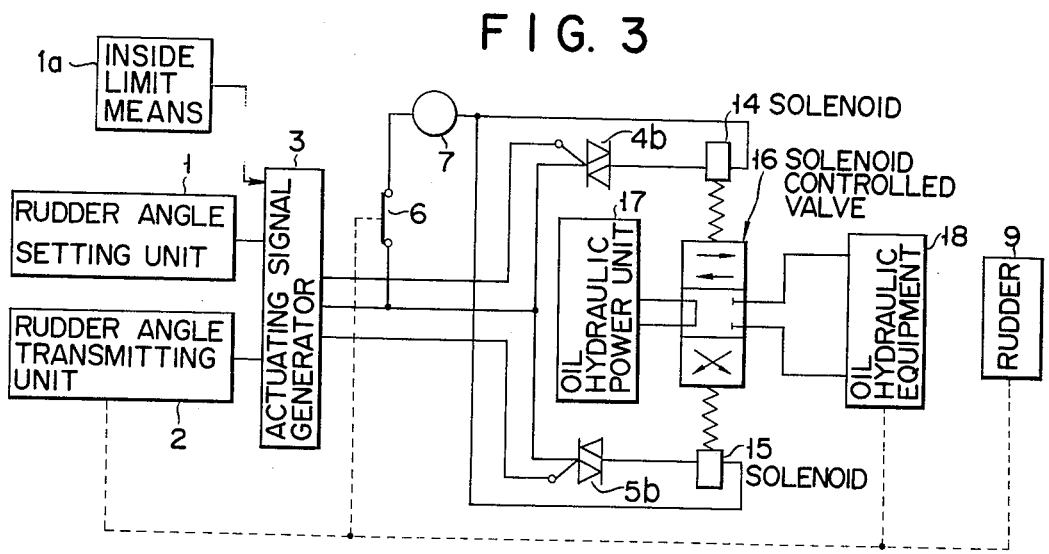
Figure 4:
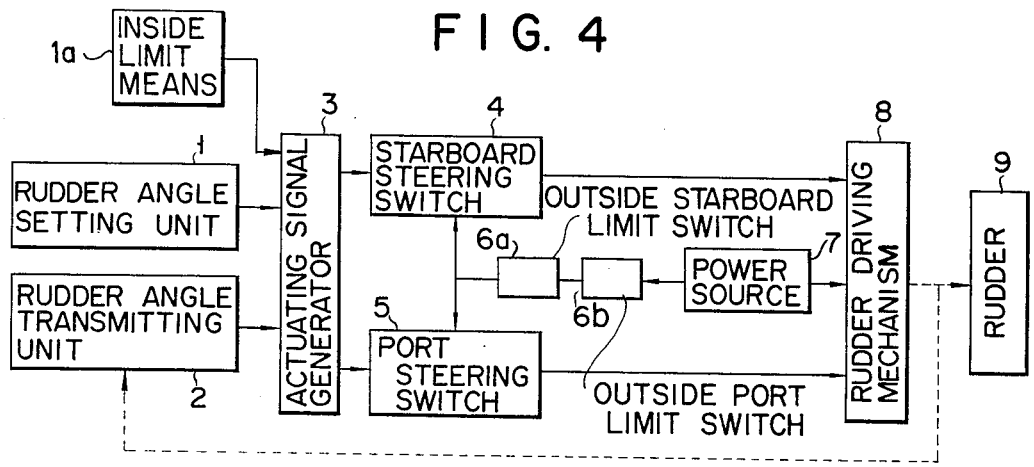
Figure 5:
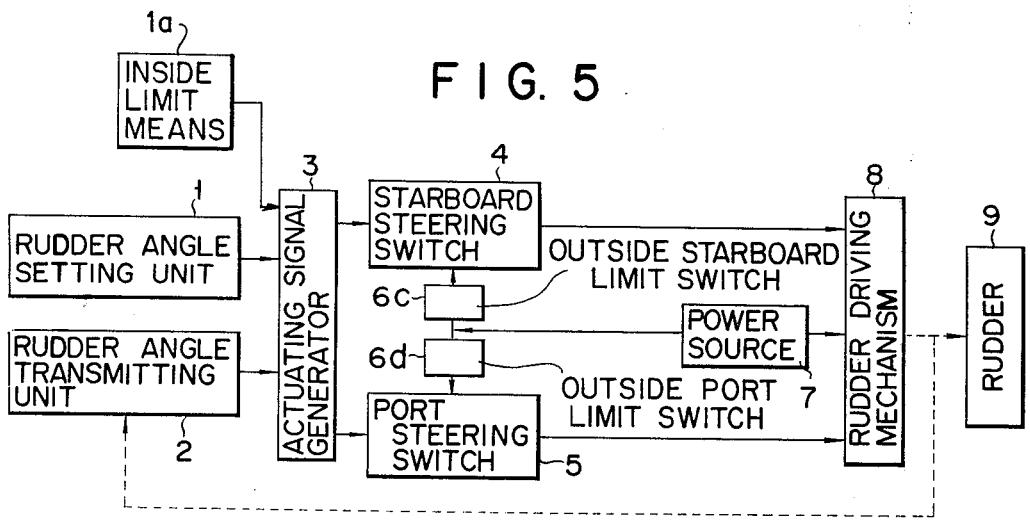

FIG. 3 presents the circuit diagram of still another embodiment, where the rudder driving mechanism of FIG. 1 is of oil pressure type;

FIG. 4 is a block circuit diagram of the embodiment of FIG. 1 provided with two serially connected limit switches instead of a single limit switch; and FIG. 5 is a block circuit diagram of the embodiment of FIG. 1 provided with, instead of a single limit switches each connected to each of the two steering switches.

Referring to FIG. 1, numeral 1 denotes a rudder angle setting unit which constitutes one unit of an automatic or remote control marine steering arrangement and generates an order signal of rudder angle. A rudder angle transmitting unit 2 is mechanically connected to the output side of a rudder driving mechanism 8, and always gives forth an actual signal of rudder angle. An actuating signal generator 3 is supplied with both order and actual signals, and when these signals indicate a difference, supplies a steering switch 4 or 5 with a starboard actuating signal or a port actuating signal, so as to reduce said difference to zero. The starboard steering switch 4 is closed upon receipt of the starboard actuating signal to connect the rudder driving mechanism 8 to the power source 7, effecting the starboard rotation of the rudder 9 through a clutch or speed reduction gear, provided if necessary. The port steering switch 5 is closed upon receipt of the port actuating signal to connect the rudder driving mechanism 8 to the power source 7 for port rudder rotation. The limit cut-off switch 6 is of normally closed type and connected in series to the power source 7 linked with the output side of the rudder driving mechanism 8 so as to be opened when the rudder 9 reaches either of the starboard and port angle limits. In this case, serially connected two limit switches 6a, 6b (FIG. 4) may be used instead of one limit switch 6, and at least one of these switches is opened to shut off the power source when the rudder reaches either of the angle limits. When required, the above-mentioned limit switch 6 may be replaced by two limit switches 6c, 6d (FIG. 5) serially connected to the steering switches 4 and 5 respectively, which are closed substantially at the same time, when the rudder removes to either starboard or port angle limit. When using two limit switches as described above, adjustment of the opening positions of the limit switches, which is necessary, for example, in case of an initial alignment and sometimes necessary in case of a periodical inspection, is performed more easily than the adjustment by one limit switch.

In the marine steering arrangement of this invention, while the rudder exists within the allowable extent, the actuating signal generator 3 is supplied with an order signal from the rudder angle setting unit 1 and an actual signal from the rudder angle transmitting unit 2, and when the rudder 9 has to make a starboard rotation, then gives forth a starboard actuating signal to close the starboard steering switch 4, thereby actuating the rudder driving mechanism 8 for rotation of the rudder 9 up to the order rudder angle position. When the rudder is moved to said position, the actuating signal generator 3 does not generate any actuating signal, thereby bringing the rudder 9 to rest. When the actuating signal generator 3 produces a port actuating signal, the above-mentioned operation is carried out to stop the rudder 9 when the rudder 9 reaches an order rudder angle position. Should the rudder 9 continue to rotate beyond the order rudder angle position due to the failure of, for example, the actuating signal generator 3 and steering switches 4, 5 causing rudder 9 to reach an angle limit, then the limit switch 6 will be opened to shut off the power source 7 and the rudder 9 will cease to rotate. Under this condition, any actuating signal supplied to the steering switch 4 or 5 can not drive the rudder driving mechanism 8, keeping the rudder 9 in an immovable state. Therefore, the rudder 9 is prevented from making any such reciprocating movement as has occurred with the prior art marine steering arrangement.

Shipping equipped with a power steering arrangement is provided with a separate emergency rudder steering means (not shown). Therefore, even if the rudder 9 reaches an angle limit due to the failure of said power steering arrangement, causing the limit switch 6 to be opened temporarily to stop the rudder movement, the emergency rudder steering means can restore the rudder 9 within the allowable extent. When, therefore, the failure is fully repaired, the power steering arrangement will be immediately brought again into operation.

In the marine steering arrangement of this invention, inside of the starboard and port angle limits, a starboard and a port inside angle limit are determined. Inside limit means are provided for preventing the rudder 9 to rotate beyond either of the inside angle limits, for the purpose of setting the controllable range of the rudder 9 slightly inside of said angle limits.

Therefore, though the rudder 9 is stopped at the inside angle limit, the rudder 9 is controlled by operating the rudder angle setting unit 1 to return the rudder to any position between the inside angle limits. This function is different from that when the rudder reaches either of the outside angle limits. Therefor except for accident, the rudder 9 does not reach either of the outside angle limits. Said inside limit means may be of a mechanical type mounted on the order rudder angle setting unit 1 to restrict excess order signal, or may be of an electrical type which is employed for limiting excess actuating signal, in a control unit such as the order rudder angle setting unit 1, the rudder angle transmitting unit 2 or the actuating signal generator 3.

In FIG. 1, 1a denotes an example of said inside limit means of electrical type. The inside limit means 1a includes an electric circuit which saturates a rudder angle setting signal from the rudder angle setting unit 1 so that once the value of the signal reaches a predetermined one, either starboard or port value, it can not further increase. Thus, it prevents the rudder angle setting unit 1 from emitting a signal which would rotate the rudder 9 beyond the inside angle limits.

Figure 2:
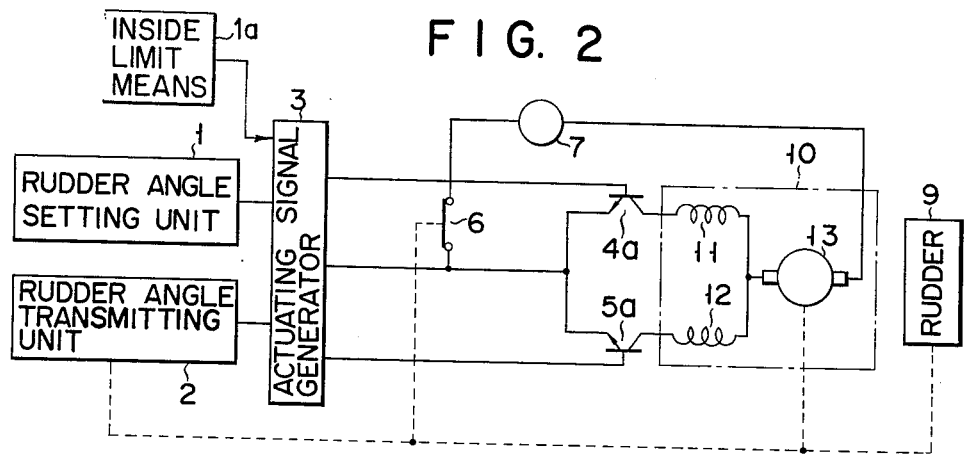
FIG. 2 shows the circuit diagram of another embodiment, when the rudder driving mechanism of FIG. 1 consists of a reversible series motor.

FIG. 2 shows a circuit diagram of a marine steering arrangement according to another embodiment, where the rudder driving mechanism 8 of FIG. 1 includes a reversible series motor 10 provided with a starboard field winding 11 and a port field winding 12. In this embodiment, the starboard steering switch 4 is replaced by a transistor 4a and the port steering switch 5 by a transistor 5a. When supplied with a starboard actuating signal, the transistor 4a is rendered conducting to excite the starboard field winding 11, thereby attaining the rotation of an armature 13 and in consequence the starboard rotation of the rudder 9. The port movement of the rudder 9 can be effected in the same manner, as described above, by operating a port actuating signal. The other parts of FIG. 2 have the same function as those of FIG. 1 and are denoted by the same numerals.

FIG. 3 indicates a circuit diagram of a marine steering arrangement according to still another embodiment of this invention where the rudder driving mechanism 8 of FIG. 1 includes an oil hydraulic equipment 18 provided with, for example, a cylinder and piston. The oil hydraulic equipment 18 is connected to an oil hydraulic power source 17 through a solenoid controlled valve 16 having solenoids 14 and 15. To the solenoids 14 and 15 are serially connected thyristors 4b and 5b respectively corresponding to the starboard and port steering switches 4 and 5 of FIG. 1. When supplied with a starboard actuating signal, the thyristor 4b is actuated to excite the starboard solenoid 14, thereby driving the oil hydraulic equipment 18 for the starboard rotation of the rudder 9. The port movement of the rudder 9 can be effected in the same manner as described above by a port actuating signal. The other parts of FIG. 3 have the same function as those of FIG. 1 and are denoted by the same numerals.

As mentioned above, this invention provides a marine steering arrangement of high reliability which includes a limit switch 6, limit switches 6a and 6b, or limit switches 6c and 6d connected in series to a power source for actuating the rudder driving mechanism 8, and opened to shut off said power source when the rudder reaches either starboard or port angle limit, thereby preventing an excessive starboard or port rudder rotation beyond either of the angle limits and in consequence eliminating the failure of, for example, the actuating signal generator 3 and steering switches 4, 5 and any other difficulties resulting from said failure.

What we claim is:

1. A marine steering arrangement comprising an order rudder angle setting unit for generating an order signal of rudder angle; a rudder angle transmitting unit for producing an actual signal of rudder angle; an actuating signal generator for producing temporarily either a starboard or port actuating signal when said order signal and said actual signal do not cancel out; a starboard steering switch closed by a starboard actuating signal; a port steering switch closed by a port actuating signal; an inside angle limit switch means for normally maintaining the rudder within a starboard and a port inside angle limit; a power source; and a rudder driving mechanism driven by power supplied from said power source through said closed steering switches so as to rotate the rudder to the order rudder angle, and further comprising outside angle limit switch means disposed for discontinuing supply of power from said power source to said rudder driving mechanism, said outside angle limit switch means being normally closed and being opened to cut off said power to the rudder driving mechanism when the rudder moves beyond the inside limit angles of said limit angles of said inside angle limit switch means due to malfunction of said steering switches, whereby the rudder will not rotate to reach the mechanical limit of rudder movement and thus will prevent damage to said steering switches and said rudder driving mechanism, while maintaining the reliability of the steering arrangement.

2. A marine steering arrangement as claimed in claim 1, wherein said outside angle limit switch means comprises one cut-off switch.

3. A marine steering arrangement as claimed in claim 1, wherein said outside angle limit switch means comprises a series of two connected cut-off switches, at least one of which is opened when the rudder reaches either of both inside angle limits.

4. A marine steering arrangement as claimed in claim 1, wherein said rudder driving mechanism comprises a reversible series motor.

5. A marine steering arrangement as claimed in claim 1, wherein said rudder driving mechanism comprises hydraulic driving means.

6. A marine steering arrangement comprising an order rudder angle setting unit for generating an order signal of rudder angle; a rudder angle transmitting unit for producing an actual signal of rudder angle; an actuating signal generator for producing temporarily either a starboard or port actuating signal when said order signal and said actual signal do not cancel out; a starboard steering switch closed by a starboard actuating signal; a port steering switch closed by a port actuating signal; an inside limit means for normally maintaining the rudder within a starboard and a port inside angle limit; a power source; and a rudder driving mechanism driven by power supplied from said power source through said closed steering switches so as to rotate the rudder to the order rudder angle, and further comprising two cut-off switches, each connected to the steering switches respectively, both being opened substantially at the same time, when the rudder reaches either of both angle limits, said cut-off switches being disposed for discontinuing supply of power from said power source to said rudder driving mechanism, said cut-off switches being normally closed and being opened to cut off said power to the rudder driving mechanism when the rudder moves beyond the inside limit angles of said limit angles of said limit means due to malfunction of said steering switches, whereby the rudder will not rotate to reach the mechanical limit of rudder movement and thus will prevent damage to said steering switches and said rudder driving mechanism, while maintaining the reliability of the steering arrangement.

* * * * *